United States Patent [19]

Bykov

[11] 4,432,239

[45] Feb. 21, 1984

[54] APPARATUS FOR MEASURING DEFORMATION

[76] Inventor: Anatoly P. Bykov, ulitsa Stroitelnaya, 6, kv. 16, Zhukovsky Moskovskoi oblasti, U.S.S.R.

[21] Appl. No.: 328,477

[22] Filed: Dec. 8, 1981

[51] Int. Cl.³ ............................................... G01L 1/24
[52] U.S. Cl. ...................................... 73/800; 356/35.5
[58] Field of Search ...................... 73/800; 356/32, 33, 356/34, 35, 35.5

[56] References Cited

U.S. PATENT DOCUMENTS

| | | | |
|---|---|---|---|
| 3,184,969 | 5/1965 | Bell | 73/800 X |
| 3,831,436 | 8/1974 | Sanford | 73/800 X |
| 3,903,734 | 9/1975 | Douglas | 73/800 X |

Primary Examiner—Jerry W. Myracle
Attorney, Agent, or Firm—Murray Schaffer

[57] ABSTRACT

Arranged in succession on a common optical axis is a laser, a modulator for shifting the frequency of light produced by the laser, an optical system for forming two light beams, a system of markers formed on the surface of a specimen being tested and a recorder of an interference pattern resulting from the interference of light scattered by the markers.

3 Claims, 4 Drawing Figures

APPARATUS FOR MEASURING DEFORMATION

BACKGROUND OF THE INVENTION

The present invention relates to measuring instruments, and more particularly to apparatus for measuring deformation.

The apparatus according to the invention can find application as a reference standard during metrological certification of resistance strain-gauge transducers or as an instrument for measuring deformation in the course of elasticity, strength and other tests.

The advancements in resistance strain-gauge transducers call for the provision of means for their accurate metrological verification. The development of design methods in the theory of elasticity and plasticity requires, in turn, the provision of an apparatus for accurate measuring the field of deformation on the surface of a test specimen for experimental checking corresponding mathematical models.

Known methods and apparatus for measuring deformation are based on the registration of relative displacement of markers, such as linear scatterers, arranged on the surface of a test specimen, or on taking record of a change in the period of a diffraction grating formed on the surface of the test specimen. A disadvantage of such known apparatus resides in the fact that they employ recorders that fail to provide required sensitivity and accuracy of measurements.

There is known an apparatus for measuring strain (U.S. Pat. No. 3,628,866, Cl. 356-32) comprising a laser cooperating with an optical system for forming two beams of light, a marker in the form of a portion of a diffraction grating applied to the surface of a test specimen, and a recorder or a display unit including a lens for receiving diffracted light and a screen positioned in the focal plane of the lens.

During deformation measurement of one of the two light beams is directed onto the diffraction grating. The light beams scattered by the diffraction grating are received by the lens to be focused on the screen. As a result of strain induced in the test specimen, the period of the diffraction grating changes causing a change in the angle between the light beams scattered by the diffraction grating. This in turn causes relative linear displacement of the light pattern focused on the screen. The value of this relative displacement of spot lights on the screen helps determine the amount of deformation to which the test specimen has been subjected.

A disadvantage inherent in the above apparatus is that it features relatively low sensitivity and accuracy due to limited resolution power and aberrations of the lens.

Also known is an apparatus for determining changes in spacing between two positions of interest (cf. U.S. Pat. No. 4,050,818, IPC G 01 b 11/16) comprising a laser, two markers in the form of linear scatterers formed at preselected points on the surface of a test specimen, a recorder of interference pattern resulting from interference of the light scattered by the markers, the recorder comprising a photodetector and a strip chart recorder. The apparatus may be used for measuring deformation of a surface between the two markers, the amount of deformation being determined through relative displacement of the markers.

The apparatus operates in the following manner. The markers are illuminated by a light beam produced by the laser. The light scattered by the markers tends to interfere. The relative displacement of the markers causes the movement of interference pattern relative to the photodetector, the latter producing an electric signal fed to the strip chart recorder. The value of the relative displacement of the markers can thereby be determined using the known initial distance therebetween, as well as by the laser beam wavelength and the number of interference fringes that have passed through the photodetector.

However, the above apparatus has low sensitivity and accuracy, since the method of measuring employed in conjunction with the apparatus fails to provide accuracy in excess of 0.1 of one interference fringe. In addition, outside vibrations or incidental displacement of the apparatus relative to the test specimen result in unwanted movement of the interference fringes and consequently to measurement errors.

Further known are apparatuses for measuring deformation (cf. Patents of U.K. Nos. 1364607 and 1454340, IPC G 10 B 11/16) comprising a laser and an optical system for forming light beams, the laser and the optical system being arranged along a common optical axis, markers in the form of a diffraction grating impinge on the surface of a test specimen, and a recorder of an interference pattern resulting from the light scattered by the diffraction grating.

The foregong apparatuses operate in the following manner: The optical system forms two intersecting light beams produced by the laser. A transparent replica grid (according to U.K. Pat. No. 1454340) is positioned at the plane of intersection of the light beams, the replica being obtained by a contact method from the diffraction grating deformed together with the surface of the test specimen; alternatively, a photographic plate (according to U.K. Pat. No. 1364607) bearing the visual recording of the deformed periodic pattern may be used. The recorder, in this case a photo camera, records an interference pattern resulting from interference of two diffracted orders belonging to different light beams illuminating the replica grid (or the photographic plate). The amount of deformation is determined by decoding the interference pattern recorded on the photographic plate.

However, the known apparatuses are disadvantageous in that they feature low resolution capacity and precision. In the first place, casting a replica from the diffraction grating deformed on the surface of the test specimen is a very time-consuming process (U.K. Pat. No. 1454340), the results of measurements being further affected by such destabilizing factors as changes in the temperature of the surrounding medium. Secondly, the apparatus for measuring deformation according to U.K. Pat. No. 1364607 makes use of a lens for recording the interference pattern produced by the deformed diffraction grating, the lens affecting the accuracy of measurements due to low resolution power optical aberrations. And thirdly, an accuracy of not higher than 0.1 of one interference fringe is attained during decording the interference patterns recorded on the photographic plates.

It is an object of the present invention to increase the accuracy and sensitivity of an apparatus for measuring deformation.

Another object of the invention is to speed up the process of measuring deformation.

Still another object of the invention is to provide for automation in the course of deformation measurements.

SUMMARY OF THE INVENTION

These and other objects are attained by providing in accord with the present invention apparatus for measuring deformation comprising, in succession on an optical axis, a laser and an optical system for forming light beams, a system of markers formed on the surface of a test specimen, and a recorder of an interference pattern resulting from interference of light scattered by the markers, according to the invention, interposed between the laser and the optical system on the same optical axis therewith is a modulator for shifting the frequency of light produced by the laser, whereas the recorder of the interference pattern includes a receiver unit comprising two (first and second) photodetectors, each of the photodetectors being optically aligned with two (first and second) markers, and an electronic phase meter connected to the outputs of the photodetectors.

The provision of the optical frequency modulator for shifting the frequency of light from the laser and the two photodetectors enables the conversion of the relative displacement of the markers impinged on the surface of the test specimen into a phase difference of the electrical signals received from the photodetectors, the phase difference being measured with high accuracy by means of the electronic phase meter.

The provision of the photoelectric recorder in the apparatus according to the invention enables the speed up of the the process of measuring deformation. In consequence, various destabilizing factors fail to affect the results of measurements. Also, such quick-acting measurements make it possible to use the proposed apparatus for measuring deformation in the course of dynamic processes.

High sensitivity of the apparatus permits measuring highly localized portions of the test specimen, the localized portions being defined as distances between the markers and serving as bases for measuring deformation; although such distances may be rather small, the apparatus is expected to provide a sufficiently high accuracy of measurements. These localized measurements are required during testing the deformation of heterogeneous specimens.

Connection of the electronic phase meter to the outputs of the photodetectors renders the apparatus insensitive to minor outside vibrations; the vibrations tending to cause equal simultaneous changes in the phases of the electrical signals from the photodetectors, while the changes are mutually subtracted in the electronic phase meter.

No lenses have been employed in the herein proposed apparatus for recording the relative displacement of markers, hence the disadvantages associated with the application of optical lenses, such as limited accuracy of measurements, have been eliminated.

According to another aspect of the invention, the photoelectric recorder makes it possible to automate the deformation measuring processes.

According to another modification of the apparatus for measuring deformation, the receiver unit thereof includes a third photodetector optically aligned with the third marker disposed relative to the first or the second marker at a distance enabling a change in the phase of electrical signals from the photodetectors optically aligned with the third and the first or the second marker not exceeding 360° throughout the entire range of deformation measurement, the outputs of the third and the first or the second photodetectors being connected via a switch to the electronic phase meter.

The arrangement in the receiver unit of the third photodetector optically aligned with the third marker positioned on the surface of the test specimen in the above manner eliminates the uncertainty in the whole number of phase cycles in the case where the change in phase difference from the first and the second photodetectors is in excess of 360°, since the electronic phase meter is capable of measuring the difference in phase within a range of from 0° to 360°. Alternatively, use can be made in the modification envoluing the employment of two photodetectors of an electroric counter of phase cycles, although this would require to keeping track of the signals from the start to the end of each measurement, which may prove impossible in many cases.

The modification of the apparatus with three photodetectors requires that two measurements be taken prior to deformation of the test specimen and another two after the test specimen has been deformed, viz. the measurement in phase difference of signals from the first and the second photodetectors (accurate reading) and, for example, from the first and the third photodetectors (approximate reading) within a range of from 0° to 360°. According to the two, i.e. "accurate" and "approximate", readings a whole number of phase cycles of the complete change in the phase difference from the first and the second photodetectors is found, the third photodetector performing an auxiliary function.

The modification with three photodetectors can be employed for measuring the deformation of various portions of the surface of a test specimen by successively moving the apparatus from one measuring position to another irrespective of the surface defects or even apertures therein acting to interrupt the optical signal during the movement of the apparatus from one position to another. Such interruptions are inadmissable when using the modification with two photodetectors, since they would affect the functioning of the phase cycles counter.

Other objects and advantages of the present invention will become more fully apparent from a detailed description of preferred embodiments of the apparatus according to the invention taken in conjunction with the accompanying drawings.

DESCRIPTION OF THE INVENTION

Figure 1:
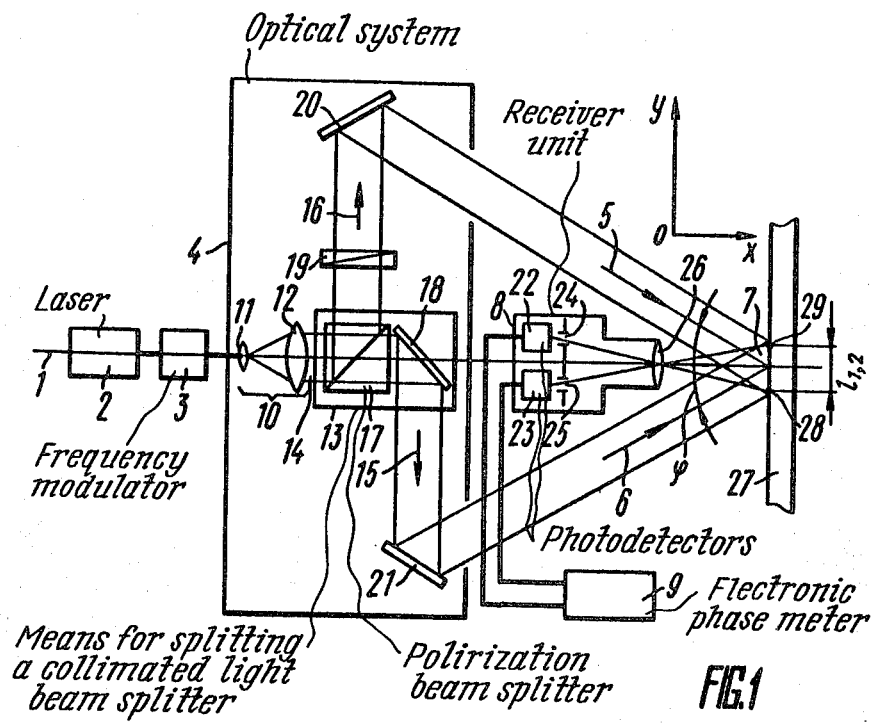
FIG. 1 is a schematic representation of an apparatus for measuring deformation according to the invention.

An apparatus for measuring deformation (FIG. 1) comprises the arrangement in succession on an optical axis 1 of a laser 2, an electrooptical frequency modulator 3 and an optical system generally indicated by 4 adapted to form two light beams 5 and 6 incident on and intersecting at 7. The apparatus further comprises a diffracted beam receiver 8 and an electronic phase meter 9.

An He-Ne laser of 8 mW in power is preferred; the choice of type and power of the laser being determined by the specifics of a problem to be solved, such as required accuracy of measurements, types of markers employed, sensitivity of photodetectors, etc. The electrooptical frequency modulator enables the shifting of the laser light frequency within a range of from tens of kHz to 5 MHz. Alternatively, acoustic modulators may be employed for effecting a light frequency shift.

The optical system 4 forming the light beams 5 and 6 incorporates, disposed along the optical axis 1, a collimator 10 comprising a microlens 11 (such as a short-focus lens or a microscope lens) and a lens 12 (such as a doublet lens), means 13 for splitting a collimated light beam 14 into beams 15 and 16 including a polarization beam splitter 17 and a mirror 18, a half-wave plate 19 arranged in the path of one of the light beams 15 or 16, and mirrors 20 and 21 adjustable in two planes.

The diffracted beam receiver 8 comprises two photodetectors 22 and 23 in the form of multiplier phototubes masked by a plate having slits 24 and 25, and a lens 26. Outputs of the photodetectors 22 and 23 are connected to inputs of the electronic phase meter 9. Any suitable analog or digital phase converter of high resolution and accuracy can be employed as the electronic phase meter 9.

Figure 2:
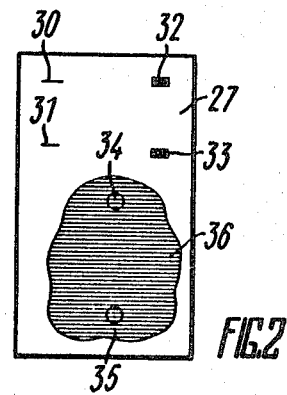
FIG. 2 shows various types of markers to be formed on the surface of a test specimen.

Prior to starting the apparatus, markers 28 and 29 are applied to the surface of a test specimen 27. With reference to FIG. 2, the markers may have the form of:

(1) scatterers formed as thin lines 30 and 31 on the surface of the specimen 27 or impinged on a spray-coated layer of aluminum if the material of the specimen has low light reflecting property, or scatterers fashioned as thin glass fibers, etc;

(2) small portions 32 and 33 of a diffraction grating have a period in agreement with an interference fringes at the plane 7 of intersection of the light beams 5 and 6; or (3) optically aligned with the photodetectors 22 and 23 portions 34 and 35 of the diffraction grating 36 formed on the entire surface of the test specimen 27, the period of the diffraction grating being likewise matched with the spacings of the interference fringes at the plane 7 of intersection of the light beams.

Thereafter, the test specimen 27 is positioned relative to the optical system 4 such that the markers 28 and 29 are in the plane 7 of intersection of the light beams 5 and 6. The photodetectors 22 and 23 are then optically aligned with the markers 28 and 29, respectively, by means of the lens 26. To this end, by moving the diffracted beam receiver 8 relative to the test specimen 27 and by displacing the lens 26 relative to the photodetectors 22 and 23 a position is found wherein the reflected image of the markers 28 and 29 produced by the lens 26 passes through the slits 24 and 25 and is received by the photodetectors 22 and 23.

The markers, such as the thin lines 30 and 31, must be oriented longitudinally of the interference fringes at the plane 7 of intersection, the orientation being monitored by means of an electronic oscilloscope, the input thereof receiving a signal from one of the photodetectors. The markers 32 and 33 or 34 and 35 require that apart from the above orientation the period of the diffraction grating be matched with the interference fringes at the plane 7 of light beams intersection. This can be effected by the accurate adjustment of the mirrors 20 and 21, the adjustment being controlled by the oscilloscope or visually according to the resulting interference pattern on the markers 32 and 33 or on the diffraction grating 36 with the modulator in a switched off position.

The apparatus according to the invention operates in the following manner.

The beam generated by the laser 2 is modulated by the electrooptical frequency modulator 3; the latter, operating in a quater-wave mode, produces two component beams with mutually orthogonal polarization and various frequencies. The collimator 10 acts to diverge the beam which has passed through the modulator 3 to a required diameter. The polarization splitter 13 acts to split the two components into the light beams 15 and 16 having mutually orthogonal polarizations and different frequencies. The half-wave plate 19 changes the direction of polarization in the beam 16 by 90°. Having reflected off of the mirrors 20 and 21, the light beams 5 and 6 are united at the plane 7 of intersection resulting in an interference pattern modulated in light intensity and frequency (moving fringe pattern).

The electric field $E_5$ and $E_6$ of the light wave in the beams 5 and 6 may be expressed in the "xoy" coordinate system as:

$$E_5 = E_o \exp\left\{ -i\left[ \omega t - \frac{2\pi}{\lambda}\left( x \cdot \cos\frac{\rho}{2} + y\sin\frac{\rho}{2} \right) \right] \right\} \quad (1)$$

$$E_6 = E_o \exp\left\{ -i\left[ (\omega - \Omega)t - \frac{2\pi}{\lambda}\left( x\cos\frac{\rho}{2} - y\sin\frac{\phi}{2} \right) \right] \right\},$$

where $E_o$ = amplitude of intensity of the electric field of the light wave;

$\omega, \lambda$ = frequency and wavelength of light produced by the laser;

$\Omega$ = value of the light frequency shift in the modulator 3;

$\rho$ = angle between the light beams 5 and 6.

Interference of the light beams 5 and 6 results in an intensity I of light at the plane 7 of intersection which is:

$$I = /E_5 + E_6/^2 = 2E_o^2\left[ 1 + \cos\left( \Omega t + \frac{4\pi}{\lambda} y \cdot \sin\frac{\rho}{2} \right) \right] \quad (2)$$

If the linear dimensions of the markers along the axis "oy" is substantially less than the width $\Lambda$ of the interference fringe at 7, viz.

$$\Lambda = \frac{\lambda}{2\sin\frac{\rho}{2}},$$

then intensities $J_1$ and $J_2$ of the light diffracted by the markers 28 and 29 may be recorded as:

$$J_1 \sim 1 + \cos\left( \Omega t + \frac{2\pi}{\Lambda} y_1 \right) \quad (3)$$

$$J_2 \sim 1 + \cos\left( \Omega t + \frac{2\pi}{\Lambda} y_2 \right),$$

where $y_1$ and $y_2$ are the coordinates of the markers 28 and 29.

The light scattered by the markers 28 and 29 is collected by the lens 26 and sent to the photodetectors 22 and 23 for the latter to convert the light beams (3) into electrical signals, the variable thereof being:

$$i_1 \sim \cos\left(\Omega t + \frac{2\pi}{\Lambda} y_1\right) \qquad (4)$$

$$i_2 \sim \cos\left(\Omega t + \frac{2\pi}{\Lambda} y_2\right)$$

The full difference $\Delta\phi_1$ of the phases of the electrical signals (4) prior to deformation of the test specimen is evidently:

$$\Delta\phi_1 = \frac{2\pi}{\Lambda}(y_2 - y_1) = \frac{2\pi}{\Lambda} l_{1,2},$$

while after deformation it is:

$$\Delta\phi_2 = \frac{2\pi}{\Lambda}(l_{1,2} + \Delta l_{1,2}),$$

where $l_{1,2}$ is the distance between the markers 28 and 29 prior to deformation, and $\Delta l_{1,2}$ is the absolute value of elongation resulting from deformation of the portion of the test specimen surface having the length of $l_{1,2}$.

A change in the phase difference $\Delta\rho_{1,2}$ of the signals (4) as a result of deformation becomes:

$$\Delta\rho_{1,2} = \Delta\phi_2 - \Delta\phi_1 = \frac{2\pi}{\Lambda}\Delta l_{1,2}, \qquad (5)$$

which is measured by the electronic phase meter 9. If $\Delta\rho_{1,2} \geq 2\pi$ radian, it is necessary to use a phase cycle counter.

From the equation (5) it is possible to determine the relative deformation $\epsilon$ of the portion of the test specimen being measured:

$$\epsilon = \frac{\Delta l_{1,2}}{l_{1,2}} = \frac{\Delta\rho_{1,2}}{2\pi} \frac{\Lambda}{l_{1,2}}, \qquad (6)$$

where $\Lambda$ and $l_{1,2}$ are the known values.

Let us evaluate the resolution capacity $\epsilon_{min}$ of the proposed apparatus.

Assuming that $l_{1,2}=10$ mm, $\Lambda=0.001$ mm (for an He-Ne laser with $\lambda=0.63$ mkm and with the angle $\rho \approx 40°$), the resolution capacity of the electronic phase meter 9 is $\delta\rho \sim 0.1° \approx 1.7 \cdot 10^{-3}$ rad. Then $$\epsilon_{min} = \frac{\delta\rho}{2\pi} \frac{\Lambda}{l_{1,2}} \approx 2.7 \cdot 10^{-8}$$

For prior art apparatuses bearing closest resemblance to the one proposed by the present invention, with equal values of $\Lambda$ and $l_{1,2}$ and at $\delta\rho \sim 36°$ have $$\epsilon_{min} = 6.3 \cdot 10^{-6}$$

which is by two orders of magnitude worse than in the herein proposed apparatus.

It is worthy of noting that although use is made in the apparatus according to the present invention of the lens 26 for aligning the photodetectors 22 and 23 with the markers 28 and 29, no special high quality requirements are prescribed for this lens 26. The purpose of the lens 26 in the proposed apparatus is to collect a sufficient amount of light scattered by the markers and divide the light beams diffracted from the markers to fall onto the respective photodetectors.

In the case where relatively small portions 32 and 33 formed by any known suitable means on the surface being measured for deformation are used as markers, each of the markers acts as a set of coherent linear scatterers resulting in an increased intensity of the useful optical signals.

Figure 3:
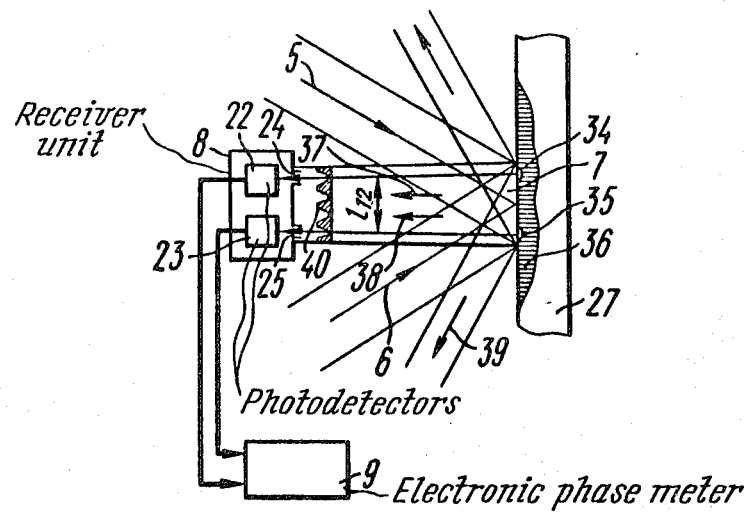
FIG. 3 illustrates schematically a portion of the apparatus for receiving light scattered by a diffraction grating formed on the surface of the test specimen.

With reference to FIG. 3, there is shown schematically the diffracted light receiver of a modification wherein relatively small portions 34 and 35 of the diffraction grating 36 formed on the entire surface of the test specimen 27 serve as markers.

The light beams 5 and 6 diffracted from the grating 36 form beams 37, 38, 39 corresponding to various diffracted orders. It is always possible to select the value of the angle $\rho$ between the light beams 5 and 6 such that, for example, the "+1" diffracted order 37 of the beam 5 and the "−1" diffracted order 38 of the beam 6 are parallel to one another. These diffracted orders interfere and the fringe pattern is registered by the two photodetectors 22 and 23 masked by the sufficiently small slits 24 and 25 spaced a distance $l_{1,2}$ from each other in the area of the geometrical separation of the diffracted orders.

As a result of deformation of the test specimen 27, the diffraction grating 36 changes its period, whereby a small angle appears between the beams 37 and 38 leading to the formation in the plane of the slits 24 and 25 of an interference pattern 40 with the final spacing of the interference fringes.

Distribution of light intensity I in the plane of the interference pattern 40 is expressed somewhat differently from the above equation (2):

$$I = I_0\left\{1 + \cos\left[\Omega t + 2\pi y\left(\frac{1}{\Lambda} - \frac{2}{d}\right)\right]\right\}, \qquad (6')$$

where $d$ is the period of the diffraction grating 36.

If the coordinates of the centers of the slits 24 and 25 are equal to $y_1$ and $y_2$, respectively, then the difference $\Delta\phi$ of the phases of the electrical signals received from the photodetectors 22 and 23 according to (6') is:

$$\Delta\phi = 2\pi\left(\frac{1}{\Lambda} - \frac{2}{d}\right)(y_2 - y_1) = 2\pi l_{1,2}\left(\frac{1}{\Lambda} - \frac{2}{d}\right).$$

If $d_0$ and $d_1$ are the periods of the diffraction grating 36 prior to and after deformation of the test specimen 27, respectively, then the change $\Delta\rho_{1,2}$ of the phase difference of the electric signals received from the photodetectors 22 and 23, as a result of the deformation of the diffraction grating 36, is:

$$\Delta\rho_{1,2} = \Delta\phi(d_1) - \Delta\phi(d_0) = 4\pi l_{1,2}\left(\frac{1}{d_0} - \frac{1}{d_1}\right). \qquad (7)$$

The relative deformation $$\epsilon = \frac{d_1 - d_0}{d_0}$$

is determined according to the known values of $l_{1,2}$ and $d_0$ and the measured phase difference $\Delta \rho_{1,2}$, according to (7), by the following equation:

$$\Delta \rho_{1,2} = \frac{4\pi l_{1,2}}{d_0} \cdot \frac{\epsilon}{\epsilon + 1}$$

As has been noted above, the markers used in the case just considered were small portions 34 and 35 of the diffraction grating 36 wherefrom the light beam was caused to fall onto the photodetectors 22 and 23, respectively. No lens was used in this modification to align the photodetectors with the markers. The slits 24 and 25 are preferably fixed relative to each other in order to ensure a constant distance $l_{1,2}$ therebetween, said distance serving as a base during deformation measurements and ensuring low susceptibility to small outside vibrations and displacements of the apparatus relative to the specimen being tested.

In the heretofore described modification of the apparatus for measuring deformation a very high resolution capacity and accuracy of measurements can be attained because, other conditions being equal, the intensity of the useful signal (and the S/N ratio) is appreciably higher than when using markers in the form of separate linear scatterers. In addition, this embodiment of the apparatus permits the measurement of the entire deformed field of the test specimen through the parallel scanning of the test specimen by the apparatus.

Figure 4:
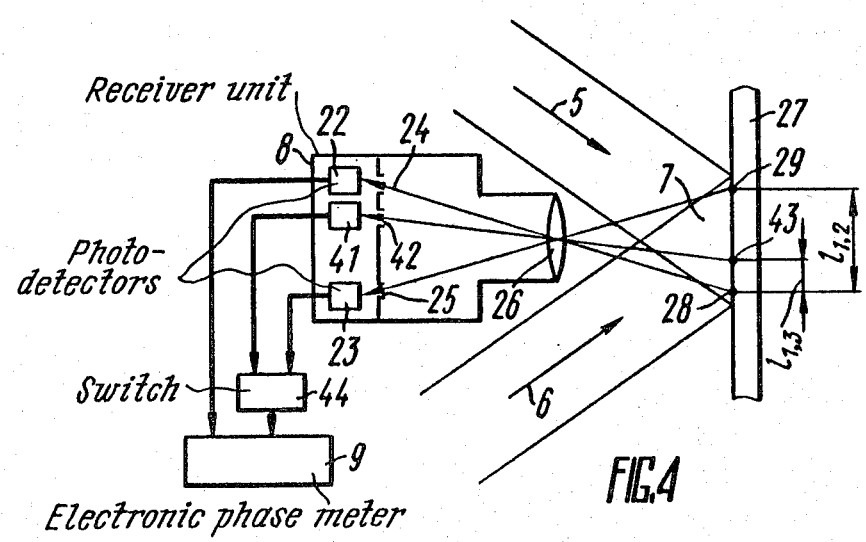
FIG. 4 represents schematically positioning of the markers on the surface of the test specimen and shows the layout of the circuit for connecting photodetectors of a modification featuring three photodetectors.

Referring now to FIG. 4, another modification of the apparatus features the diffracted light receiver 8 having an additional or third photodetector 41 provided with a slit 42 aligned by means of the lens 26 with a third marker 43 arranged on the surface of the test specimen 27, the marker 43 being spaced from the first marker 28 a distance $l_{1,3}$. The outputs of the photodetectors 41 and 23 are connected to one of the inputs of the electronic phase meter 9 via a switch 44.

Use was made in this modification of a two position toggle switch, although any known suitable switch, such as an electronic switch, can be used.

The modification of the apparatus with three photodetectors operates similarly to the modification having two photodetectors. What needs commenting is the way to eliminate the uncertainty in the whole number of phase cycles of phase difference from the photodetectors 22 and 23 and the choice of distance between the first and third markers 28 and 43.

If it is known that relative deformation $\epsilon$ of the test specimen 27 a fortiori fails to exceed a certain value $\epsilon_{max}$, then according to (6) at $\Delta \rho \leq 2\pi$ we have:

$$l_{1,3} \leq \frac{\Lambda}{\epsilon_{max}}.$$

The change in phase difference from the first and third photodetectors 22 and 41, according to (5), for the case in question will be:

$$\Delta \rho_{1,3} = \frac{2\pi}{\Lambda} \Delta l_{1,3} \leq 2\pi$$

The change $\Delta \rho_{1,2}$ in phase difference of the signals from the first and second photodetectors 22 and 23 may be expressed as:

$$\Delta \rho_{1,2} = \frac{2\pi}{\Lambda} l_{1,2} = 2\pi N + \rho_{1,2} \quad (8)$$

where N is the whole number of phase cycles; and $\rho_{1,2}$ is the phase difference as measured by the phase meter 9, $$\rho_{1,2} = 0 \div 2\pi$$

Assuming that deformation of the test specimen 27 at the portion $l_{1,2}$ is homogeneous, the approximate equation will be:

$$\frac{\Delta \rho_{1,2}}{\Delta \rho_{1,3}} \approx \frac{l_{1,2}}{l_{1,3}},$$

or $$2\pi N + \rho_{1,2} \approx \rho_{1,3} \frac{l_{1,2}}{l_{1,3}}$$

Wherefrom the value of N is found by rounding off to a nearest whole number:

$$N = \text{int}\left[\frac{1}{2\pi}\left(\Delta \rho_{1,3} \frac{l_{1,2}}{l_{1,3}} - \rho_{1,2}\right) + \frac{1}{2}\right] \quad (9)$$

where int (z) is the function of the whole portion of the number z.

Therefore, according to the measured values of $\rho_{1,2}$ and $\rho_{1,3}$ the number N of phase cycles is first determined by using the equation (9) and then by using the equation (8) complete change in phase difference $\Delta \rho_{1,2}$ is found, whereafter relative deformation $\epsilon$ of the portion of the surface having the length $l_{1,2}$ is found according to the equation (6).

It also should be noted that the intensity of the useful optical signal may be appreciably enhanced by concentrating the laser beam directly on the markers. To attain this, the optical system must be modified, viz. instead of two broad beams several (according to the number of markers) pairs of narrow beams with equal spacing between interference fringes at beam intersections must be employed. At a relatively large distance between the markers a gain of several orders of magnitude may be attained in the intensity of useful optical signal enabling to use He-Ne lasers of 1 mW in power and less.

The herein proposed apparatus, subject to proper modification of the optical system and employment of a second diffracted light receiver, may work as a two-channel apparatus and be used for measuring deformation of a test specimen surface in two mutually perpendicular directions. Separation of the channels is effected in this case according to polarization of light scattered by the markers. A second system of markers must be formed on the surface of the test specimen orientated perpendicularly relative to the markers of the first system.

We claim:

1. Apparatus for measuring deformation of the surface of a test specimen comprising:
   (a) a laser and an optical system arranged on a common optical axis for forming two light beams intersecting each other and forming an interference pattern;
(b) a modulator for shifting the frequency of light produced by said laser interposed between said laser and said optical system;
(c) a system of markers formed on the surface of said test specimen in the region of intersection of said light beams;
(d) a receiver unit including first and second photodetectors, each of said photodetectors being optically aligned with a corresponding first and second marker of said system of markers; and
(e) an electronic phase meter connected to outputs of said photodetectors for measuring the difference in the phase of electrical signals thereof to determine the relative displacement of the first and the second of said markers and hence the amount of deformation to which the surface of said test specimen has been subjected.

2. The apparatus according to claim 1 wherein the received unit has a third photodetector optically aligned with a third marker of said system of markers and positioned relative to the first marker at a distance providing difference in the phase of electrical signals from said photodetectors optically aligned with the third and the first said markers which is below 360° throughout the entire range of deformation measurement, the outputs of the third and the second of said photodetectors being connected via a switch to said electronic phase meter.

3. The apparatus according to claim 1 wherein the receiver unit has a third photodetector optically aligned with the third marker of said system of markers and positioned relative to said second marker at a distance providing a difference in the phase of electrical signals from said photodetectors optically aligned with the third and the second said markers which is below 360° throughout the entire range of deformation measurement, the outputs of the third and the first of said photodetectors being connected via a switch to said electronic phase meter.

* * * * *